United States Patent
Boemcke

(10) Patent No.: US 10,144,431 B2
(45) Date of Patent: Dec. 4, 2018

(54) CONTROL DEVICE FOR A MOTOR VEHICLE FOR LAUNCH ASSISTANCE

(71) Applicant: Bayerische Motoren Werke Aktiengesellschaft, Munich (DE)

(72) Inventor: Eberhard Boemcke, Unterschliessheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/414,807

(22) Filed: Jan. 25, 2017

(65) Prior Publication Data
US 2017/0210385 A1    Jul. 27, 2017

(30) Foreign Application Priority Data
Jan. 26, 2016    (DE) .................... 10 2016 201 091

(51) Int. Cl.
*F02D 41/02* (2006.01)
*B60W 30/188* (2012.01)
*F02D 41/04* (2006.01)

(52) U.S. Cl.
CPC ....... *B60W 30/1884* (2013.01); *F02D 41/022* (2013.01); *F02D 41/023* (2013.01);
(Continued)

(58) Field of Classification Search
CPC ......... B60W 30/1884; B60W 30/1888; B60W 30/20; B60W 2030/203; B60W 2030/206;
(Continued)

(56) References Cited

U.S. PATENT DOCUMENTS

| 5,050,453 A | 9/1991 | Yamaguchi |
| 2007/0010929 A1* | 1/2007 | Takeda .................. B60K 28/16 |
| | | 701/82 |

(Continued)

FOREIGN PATENT DOCUMENTS

| DE | 689 19 581 T2 | 4/1995 |
| DE | 102 50 729 A1 | 5/2004 |

(Continued)

OTHER PUBLICATIONS

German Search Report issued in counterpart German Application No. 10 2016 201 091.3 dated Sep. 13, 2016 with partial English translation (13 pages).

*Primary Examiner* — Lindsay Low
*Assistant Examiner* — George Jin
(74) *Attorney, Agent, or Firm* — Crowell & Moring LLP

(57) ABSTRACT

A control device and method are provided for launch assistance for a motor vehicle having an internal combustion engine as drive engine. The control device is designed to predict a stall of the internal combustion engine of the motor vehicle on the basis of at least one signal, and, if a stall of the internal combustion engine is predicted, to output a signal for initiating launch assistance. The control device is designed to predict the stall of the internal combustion engine on the basis of the engine rotational speed of the internal combustion engine and the gradient of the engine rotational speed of the internal combustion engine before the clutch-engagement rotational speed is reached. If a stall of the internal combustion engine is predicted, the control device is designed to output a signal for initiating an increase of the engine torque demand of the internal combustion engine.

5 Claims, 4 Drawing Sheets

(52) U.S. Cl.
CPC . *F02D 41/0205* (2013.01); *B60W 2710/0661* (2013.01); *F02D 41/042* (2013.01); *F02D 2200/101* (2013.01); *F02D 2200/1012* (2013.01); *F02D 2250/21* (2013.01)

(58) Field of Classification Search
CPC ........ B60W 2710/0661; F02D 41/0205; F02D 41/022; F02D 41/023; F02D 41/042; F02D 41/0225; F02D 41/045; F02D 2200/10; F02D 2200/101; F02D 2200/1012; F02D 2250/21; F02D 2250/28
See application file for complete search history.

(56) References Cited

U.S. PATENT DOCUMENTS

| | | | |
|---|---|---|---|
| 2012/0150371 A1 | 6/2012 | Swales et al. | |
| 2015/0059693 A1* | 3/2015 | Goho | F02D 31/002 |
| | | | 123/399 |

FOREIGN PATENT DOCUMENTS

| | | | | |
|---|---|---|---|---|
| DE | 10250729 A1 * | 5/2004 | ............ | B60W 10/02 |
| DE | 10 2008 052 839 A1 | 5/2010 | | |
| DE | 10 2011 120 173 A1 | 6/2012 | | |
| DE | 103 15 398 B4 | 8/2013 | | |
| DE | 10 2015 202 932 A1 | 8/2016 | | |

* cited by examiner

CONTROL DEVICE FOR A MOTOR VEHICLE FOR LAUNCH ASSISTANCE

CROSS REFERENCE TO RELATED APPLICATION

This application claims priority under 35 U.S.C. § 119 from German Patent Application No. 10 2016 201 091.3, filed Jan. 26, 2016, the entire disclosure of which is herein expressly incorporated by reference.

BACKGROUND AND SUMMARY OF THE INVENTION

The invention relates to a control device for launch assistance for a motor vehicle and to a corresponding method.

During a launch process of a motor vehicle, it is basically possible for an undesired stall of the internal combustion engine to occur if the torque provided by the internal combustion engine is not high enough. Here, the dual-mass flywheel, also referred to as ZMS, is briefly operated in a resonance range. In order to prevent damage to the dual-mass flywheel, so-called protective functions are implemented in the vehicle, which identify a stall of the engine at an early time and initiate corresponding measures to prevent damage to the components. Here, it is basically the case that the rotational speed signal of the engine is measured, and a stall of the engine is detected if the rotational speed of the engine falls below a predefined rotational speed threshold—of e.g. 400 revolutions per minute (rpm).

For example, DE 10 2008 052 839 A1 discloses a control device for a motor vehicle which detects a stall of the engine on the basis of the rotational speed of the engine and, if a stall of the engine is detected, subsequently initiates an automatic start if corresponding conditions are satisfied. In detail, a stall of the engine is detected if the rotational speed falls below a predefined low rotational speed threshold, or if the rotational speed of the engine, proceeding from an initial rotational speed exceedance of a predefined high rotational speed threshold, then undershoots the predefined low rotational speed threshold.

Furthermore, the as yet unpublished DE 10 2015 202 932 A1 discloses a control device for the early identification of the stall of an engine in a motor vehicle, the control device being designed to identify a stall on the basis of the clutch-engagement rotational speed and the rotational speed gradient of the engine rotational speed.

To prevent a stall, DE 10 2011 120 173 A1 discloses a control device of a hybrid vehicle with manual gearbox, wherein a controller of the control device is designed to control the torque output by the engine such that a stall of the engine and/or excessive revving of the engine during a manual actuation of the clutch is prevented. To identify an impending stall situation, the controller receives one or more signals from an input shaft sensor, from the clutch pedal sensor and from the accelerator pedal sensor, and correspondingly evaluates said signals. Such an approach is cumbersome and associated with high costs, because such sensors are not normally installed in the vehicle. Furthermore, this functions only in interaction with an electric machine.

It is now an object of the invention to provide an improved control device and a corresponding method for the early identification of a stall of the engine and for initiation of corresponding countermeasures.

This and other objects are achieved by way of a control device and corresponding method for launch assistance for a motor vehicle having an internal combustion engine as drive engine, which control device is designed to predict a stall of the internal combustion engine of the motor vehicle on the basis of at least one signal, and, if a stall of the internal combustion engine is predicted, to output a signal for initiating launch assistance. The control device is designed to predict a stall of the internal combustion engine on the basis of the engine rotational speed of the internal combustion engine and the gradient of the engine rotational speed of the internal combustion engine before the clutch-engagement rotational speed is reached. And, if a stall of the internal combustion engine is predicted, the control device is configured to output a signal for initiating an increase of the engine torque demand of the internal combustion engine.

The invention is based firstly on the knowledge that, if a stall is identified during launch by evaluation of the rotational speed with regard to an undershooting of a threshold value, the selection of the threshold value constitutes a fundamental problem. If the threshold value is selected to be too high, corresponding protective measures are duly initiated at an early time, but the likelihood of so-called incorrect identification increases, that is to say the corresponding protective measures are initiated more often than required. This would in turn have an adverse effect on customer acceptance. However, if the threshold value is selected to be too low, the rotational speed of the engine may fall into a very low range, even into the resonance rotational speed range of a dual-mass flywheel. This would, at least in the case of certain engine variants, lead to extremely large rotational oscillations in the dual-mass flywheel, which, under some circumstances, would cause irreversible component damage even in the event of a single occurrence.

Taking this knowledge into consideration, it is proposed, with regard to the predictive identification or prediction of an impending stall situation, that a control device for launch assistance for a motor vehicle having an internal combustion engine as drive engine be provided, which control device may be a control unit having a processor and is designed to predict a stall on the basis of the engine rotational speed of the internal combustion engine and the gradient of the engine rotational speed of the internal combustion engine before the clutch-engagement rotational speed or clutch-engagement time is reached. To prevent a stall, the control unit is, according to the invention, furthermore designed such that, if a stall of the internal combustion engine is predicted, said control unit outputs a signal for initiating an increase of the engine torque demand (and thus of the engine torque) of the internal combustion engine.

It has been discovered that, in an advantageous embodiment of the invention, the rotational speed gradient of the internal combustion engine can be determined in a manner dependent on at least a minimum rotational speed of the internal combustion engine during at least one preceding ignition event of the engine before the clutch-engagement rotational speed or the clutch-engagement time is reached, in particular from the minimum rotational speeds of the internal combustion engine of at least two or more ignition events of the internal combustion engine before the clutch-engagement rotational speed is reached. It is likewise possible for the rotational speed gradient of the engine rotational speed to be determined by way of the engine rotational speed at the top dead center of each cylinder and the time between two ignition events.

It is advantageously possible, for the detection of an impending stall of the engine, for consideration to additionally be given to a further signal which provides an indication of an impending stall of the engine, that is to say the control device is advantageously designed to predict a stall of the internal combustion engine, before the clutch-engagement time is reached, on the basis of the engine rotational speed of the internal combustion engine and the gradient of the engine rotational speed of the internal combustion engine and at least one further signal. An evaluation of a signal which corresponds to the rotational speed of the gearbox input shaft is advantageously suitable here.

In a particularly advantageous embodiment of the invention, the control device is designed to predict a stall of the internal combustion engine on the basis of the engine rotational speed of the internal combustion engine and the gradient of the engine rotational speed of the internal combustion engine and the rotational speed of the gearbox input shaft and/or the gradient of the rotational speed of the gearbox input shaft.

To now be able to detect a stall of the internal combustion engine at an early time, that is to say predictively, the control device is advantageously designed to predict a stall of the internal combustion engine on the basis of a calculated clutch-engagement rotational speed, in particular if the clutch-engagement rotational speed, which is calculated on the basis of the engine rotational speed and the gradient of the engine rotational speed, and possibly on the basis of the rotational speed of the gearbox input shaft and/or the gradient of the rotational speed of the gearbox input shaft, is lower than a predefined (variable) clutch-engagement rotational speed threshold.

If, by way of the correspondingly designed control device, a stall of the internal combustion engine (during the launch process) is predicted at an early time, corresponding measures for preventing a stall of the internal combustion engine and for preventing component damage must be implemented. According to the invention, for this purpose the control device is advantageously designed to initiate, if a stall of the internal combustion engine is predicted, a targeted increase of the engine torque and/or of the assumed clutch-engagement rotational speed by initiating an increase of the engine torque demand of the internal combustion engine. For this purpose, the control device is advantageously designed to output, if a stall of the internal combustion engine is predicted, a signal for initiating an increase of the engine torque demand of the internal combustion engine, such that a correspondingly dependent increase of the engine torque demand occurs. The signal is dependent on the calculated clutch-engagement rotational speed or is dependent on (i) the present rotational speed of the internal combustion engine, (ii) the present rotational speed gradient of the internal combustion engine, (iii) the present rotational speed of the gearbox input shaft, and/or (iv) the present rotational speed gradient of the gearbox input shaft. In other words, it is possible for an increase of the engine torque demand to be performed, for example, in a manner dependent on the deviation between the calculated clutch-engagement rotational speed and a required clutch-engagement rotational speed. The magnitude may be predefined in particular in a manner dependent on the magnitude of the deviation.

It is likewise the case, in an advantageous refinement, that the control device is designed to at least partially withdraw a signal for increasing the engine torque demand of the internal combustion engine, which signal has been triggered if a stall of the internal combustion engine is predicted, if a stall of the internal combustion engine is no longer predicted on the basis of a determined calculated clutch-engagement rotational speed.

The above statements with regard to the control device according to the first aspect of the invention correspondingly also apply to a method according to the second aspect of the invention.

The method according to the invention, and the advantageous refinements thereof, may be performed by way of an implemented algorithm or a corresponding component arrangement in a processor-based control unit provided for the purpose, in particular in an engine control unit.

A third aspect of the invention is directed to a vehicle which includes a control device as described above.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
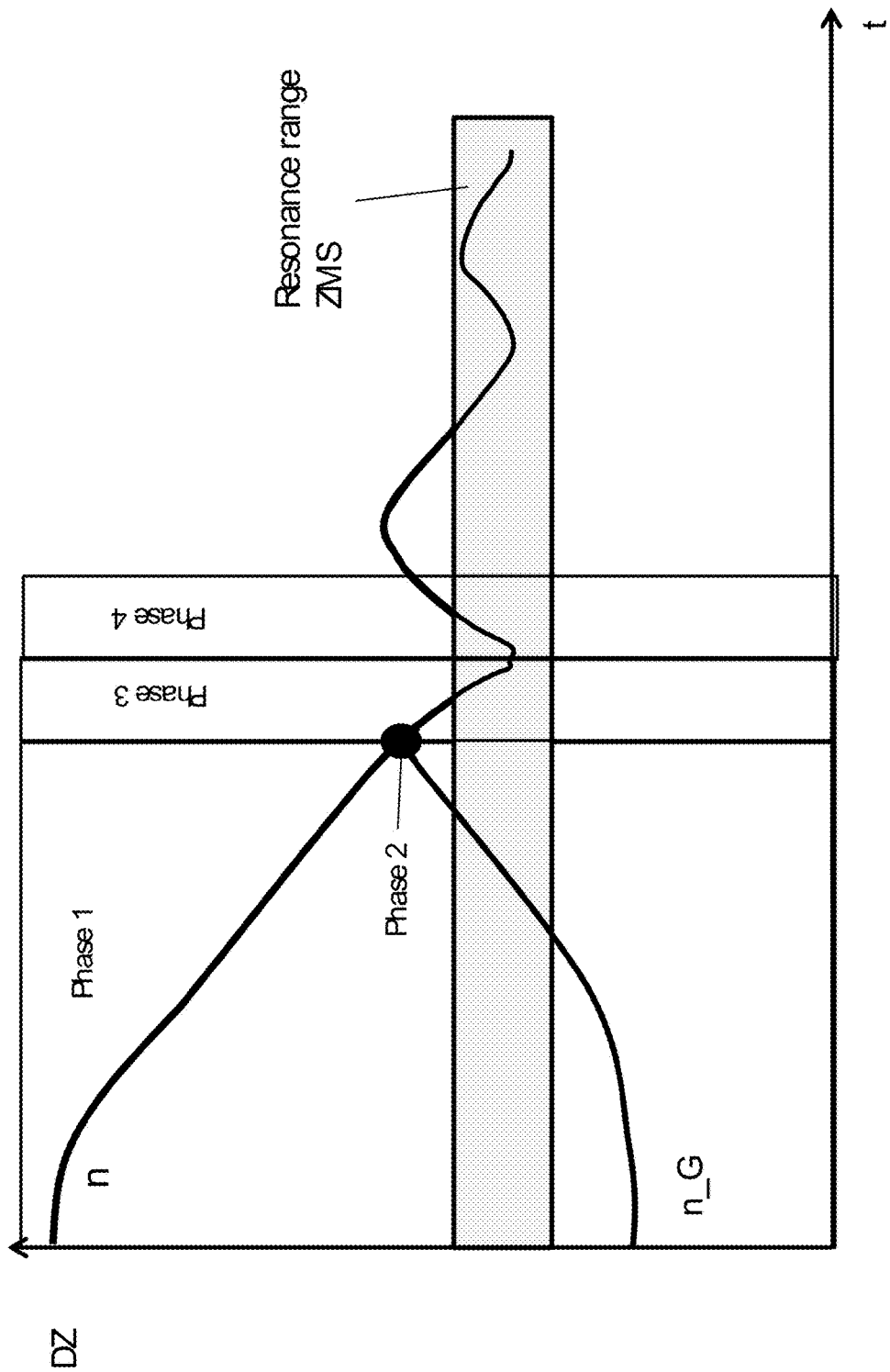
FIG. 1 is a graphical illustration of the engine rotational speed and gearbox input shaft rotational speed in the case of a critical launch process.

FIG. 1 shows, in detail, in a characteristic map spanned by the time t and the rotational speed DZ, the engine rotational speed n and the gearbox rotational speed n_G of the gearbox input shaft during a clutch-engagement or launch process of a motor vehicle. During the illustrated phase 1, the clutch-engagement process commences, that is to say the build-up of the clutch torque occurs. Here, the energy of the engine is converted partially into potential elastic energy in the drivetrain and partially into slippage energy. The potential elastic energy is furthermore converted into kinetic vehicle energy. The engine rotational speed n falls proceeding from the idle rotational speed, and the gearbox input shaft rotational speed n_G increases. In phase 2, or at point 2, the drivetrain is completely closed for the first time; the clutch-engagement rotational speed has been reached. The engine rotational speed n and the gearbox input rotational speed n_G are identical from this time onward. At this point, the drivetrain is preloaded to the maximum extent, and is now completely connected to the engine.

The relaxation of the drivetrain commences in phase 3, whereby, owing to the inertias present, the rotational speed (engine rotational speed and gearbox rotational speed) falls further until it reaches the lowest value at the end of phase 3. In phase 4, the drivetrain is initially in a relaxed state and then becomes braced again. The relaxation and bracing explains the low-frequency jerky vibration in the drivetrain in the event of a stall of the engine.

If, in phase 3 and/or phase 4, the rotational speed falls into the resonance rotational speed range of the dual-mass flywheel ZMS, extremely large rotational oscillations can arise in the dual-mass flywheel ZMS, which in the worst case may lead to irreversible component damage.

To be able to identify a stall of the internal combustion engine at an early time and thereupon be able to initiate countermeasures, the present invention provides at least an evaluation of the engine rotational speed n and of the gradient of the engine rotational speed n of the internal combustion engine before the clutch-engagement rotational speed is reached.

Figure 2:
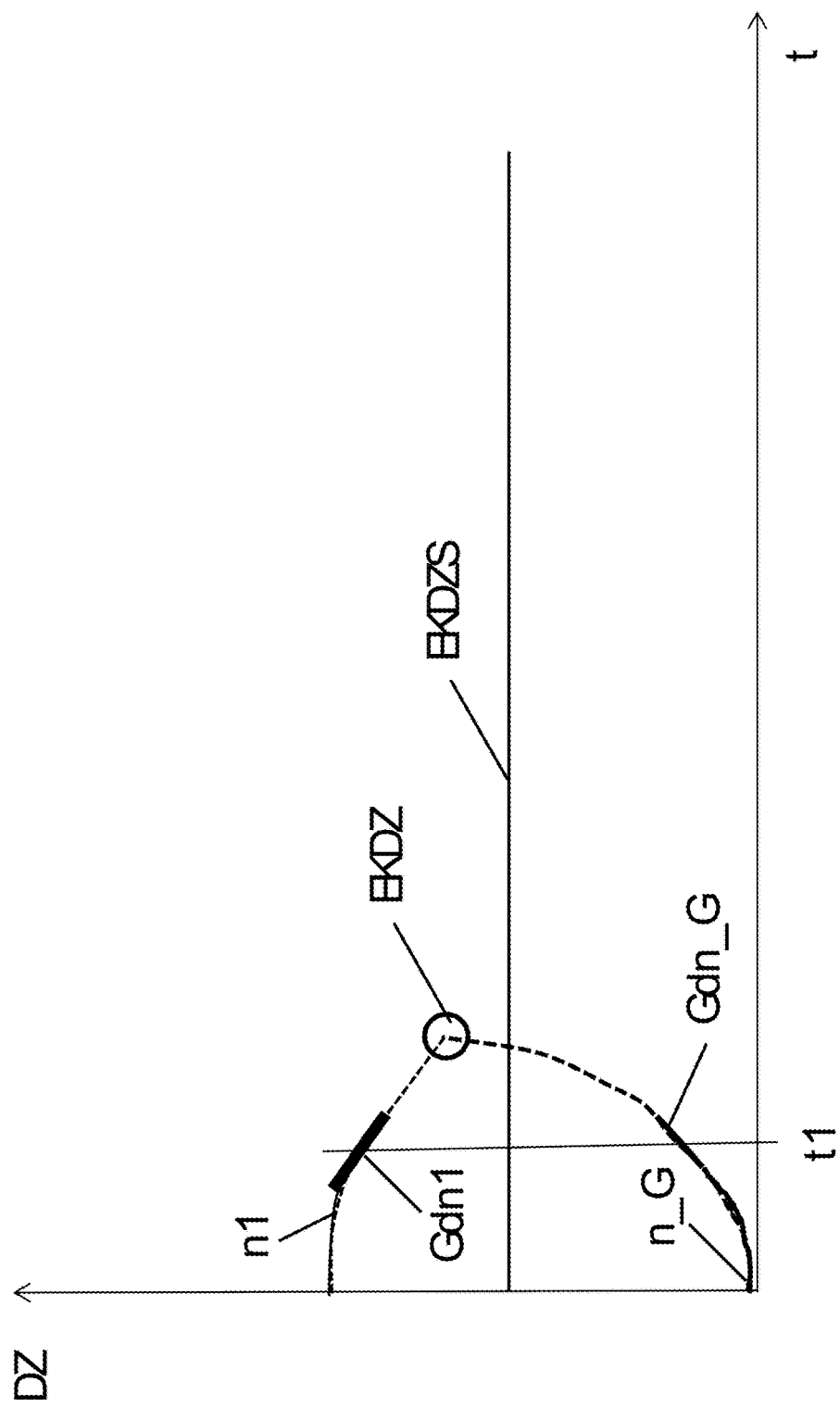
FIG. 2 is a graphical illustration of the signals to be evaluated for the prediction of a stall of an internal combustion engine in a vehicle during a clutch engagement process.

A corresponding illustration of an engine rotational speed profile and of a gearbox input shaft rotational speed n_G in the case of a (critical) clutch-engagement and launch process is shown in FIG. 2.

Based on the rotational speed profile (present rotational speed n1 and gradient of the rotational speed profile Gdn1) of the internal combustion engine and the gearbox input shaft rotational speed n_G and the gradient Gdn_G thereof, it is possible, for example at the time t1, to predictably calculate the assumed clutch-engagement rotational speed EKDZ. The prediction of the assumed clutch-engagement rotational speed EKDZ may be performed continuously (e.g. every 10 ms), such that the determination is always performed on the basis of the present situation. The calculated clutch-engagement rotational speed EKDZ is subsequently compared with a predefined clutch-engagement rotational speed threshold EKDZS, whereby a stall of the internal combustion engine can be predicted. If the assumed clutch-engagement rotational speed EKDZ lies above the predefined clutch-engagement rotational speed threshold EKDZS, a non-critical clutch engagement process is assumed. However, if the assumed clutch-engagement rotational speed EKDZ lies below the predefined clutch-engagement rotational speed threshold EKDZS, a critical clutch-engagement process is assumed, and a stall of the internal combustion engine is predicted.

Figure 3:
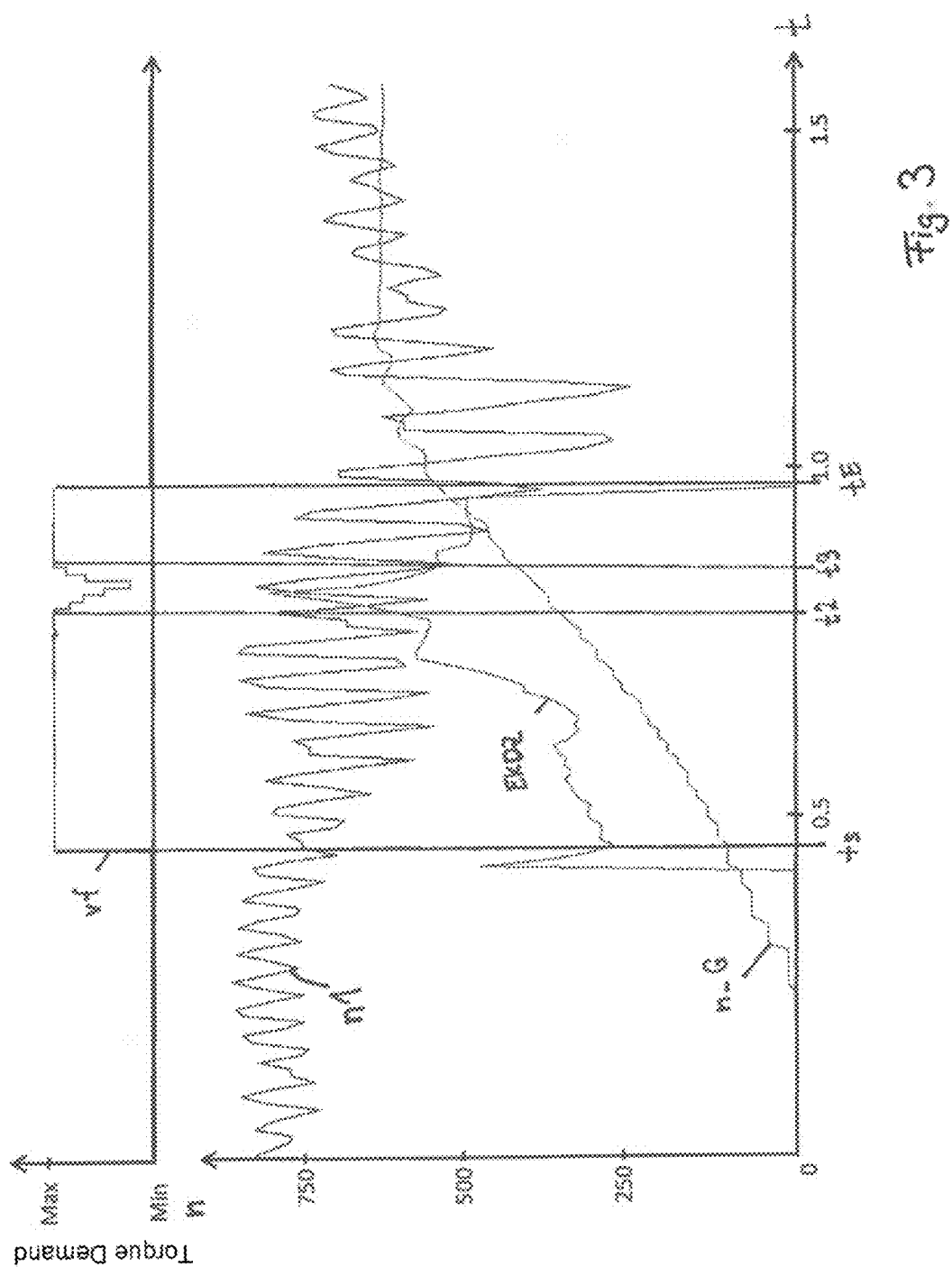
FIG. 3 is an illustration of a triggered torque demand in the event of a stall of the internal combustion engine being predicted.

FIG. 3 is an illustration of a triggered torque demand in the event of a stall of the internal combustion engine being predicted versus the time t. Here, the clutch-engagement rotational speed is calculated continuously on the basis of the rotational speed n1 of the internal combustion engine and the respective gradient of the rotational speed of the internal combustion engine and the rotational speed n_G of the gearbox input shaft and possibly the gradient of the rotational speed of the gearbox input shaft.

At the time ts, owing to the predicted low clutch-engagement rotational speed EKDZ, a maximum torque demand is triggered, which is manifest in the gain factor vf illustrated above the rotational speed illustration. Upon the start of the increase of the torque demand by way of an increase of the gain factor vf (and the associated implementation of the increase of the engine torque), the rotational speed n1, and thus also the gradient of the internal combustion engine, increase. This, in conjunction with the continuously increasing rotational speed n_G of the gearbox input shaft, leads to an increase of the calculated clutch-engagement rotational speed EKDZ. In the range between t2 and t3, the calculated clutch-engagement rotational speed EKDZ reaches a value which considerably reduces the risk of a stall of the internal combustion engine, for which reason the triggering of the increase of the torque demand can be at least partially reduced or withdrawn. At the time tE, at which the clutch-engagement process has been completed, the increase of the torque demand is fully withdrawn again, because, owing to the high clutch-engagement rotational speed EKDZ that has been attained, there is no longer the risk of a stall of the internal combustion engine.

Figure 4:
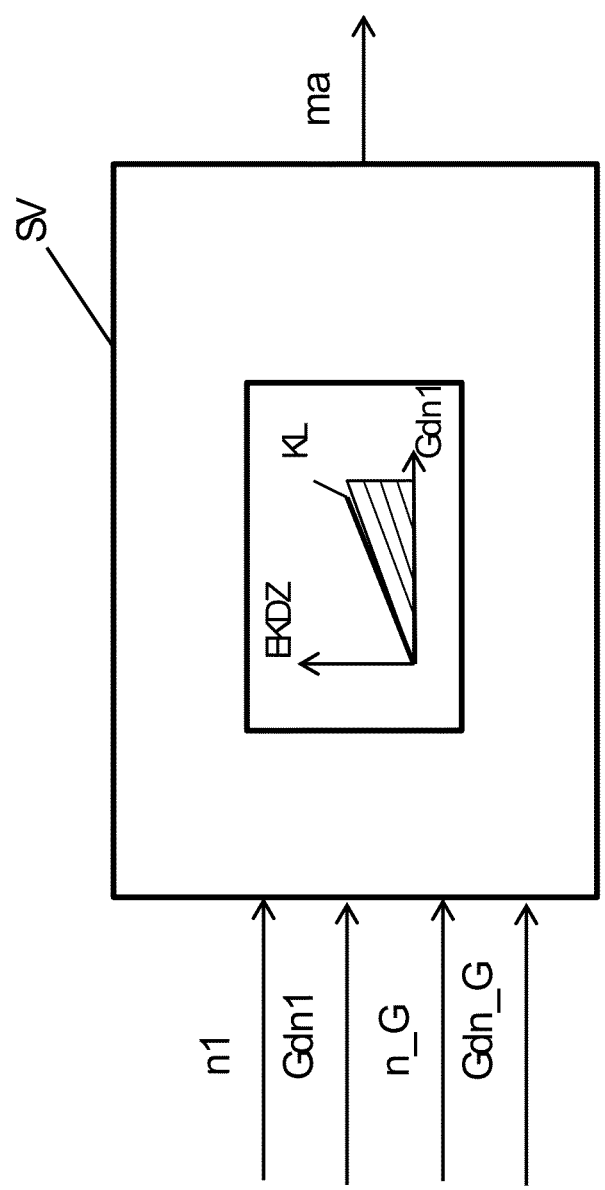
FIG. 4 is a schematic block diagram of an example of a control device according to the invention.

FIG. 4 shows a possible configuration of a control device SV according to the invention for launch assistance for a motor vehicle having an internal combustion engine as drive engine. The control device, during an initiated clutch-engagement and launch process, receives the rotational speed n1 of the internal combustion engine, the gradient Gdn1 of the rotational speed of the internal combustion engine, the rotational speed n_G of the gearbox input shaft and the gradient Gdn_G of the rotational speed of the gearbox input shaft as input signals. On the basis of these signals n1, Gdn1, n_G and Gdn_G, the clutch-engagement rotational speed EKDZ is firstly predictively calculated, and this is checked, by way of a characteristic curve KL which is stored in the control device and which is spanned by clutch-engagement rotational speed EKDZ and the rotational speed gradient Gdn1, with regard to whether the intersection point of the calculated clutch-engagement rotational speed EKDZ lies above or below the threshold characteristic curve KL. If the intersection point lies below the threshold characteristic curve (hatched region), a stall of the engine is predicted, and a signal ma for increasing the engine torque demand is output, whereby it is sought to realize an increase of the predicted (and actual) clutch-engagement rotational speed. When the predicted clutch-engagement rotational speed is high enough, or the clutch-engagement process has come to an end, the increase of the engine torque demand is withdrawn.

With the invention proposed here, it is thus possible in a simple and reliable manner for a stall of the engine to be predicted, and counteracted, at an early time. Owing to this stall identification at an early time, and the early initiation of the corresponding countermeasures, it is also possible for component damage to the dual-mass flywheel to be prevented.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A control device for launch assistance for a motor vehicle having an internal combustion engine as a drive engine, comprising:
   a control unit that includes a processor and executes instructions
       to predict a stall of the internal combustion engine if a clutch-engagement rotational speed, calculated based on an engine rotational speed of the internal combustion engine, a gradient of the engine rotational speed of the internal combustion engine, a rotational speed of a gearbox input shaft and/or a gradient of the rotational speed of the gearbox input shaft, is lower than a predefined clutch-engagement rotational speed threshold, and
   if the stall of the internal combustion engine is predicted, to output a signal that initiates an increase of an engine torque demand of the internal combustion engine.

2. The control device according to claim 1, wherein the control unit further executes instructions:
   to output, if the stall of the internal combustion engine is predicted, the signal that initiates the increase of the engine torque demand of the internal combustion engine such that a correspondingly dependent increase of the engine torque demand occurs, wherein said signal is dependent on the calculated clutch-engagement rotational speed or is dependent on (i) a present rotational speed of the internal combustion engine, (ii) a present rotational speed gradient of the internal combustion engine, (iii) a present rotational speed of the gearbox input shaft, and/or (iv) a present rotational speed gradient of the gearbox input shaft.

3. The control device according to claim 1, wherein the control unit further executes instructions:
to at least partially withdraw the signal for increasing the engine torque demand of the internal combustion engine, which signal was triggered if the stall of the internal combustion engine was predicted, if the stall of the internal combustion engine is no longer predicted based on the calculated clutch-engagement rotational speed.

4. A vehicle comprising the control device according to claim 1.

5. A method for launch assistance of a motor vehicle having an internal combustion engine as a drive engine, the method comprising the acts of:
predicting a stall of the internal combustion engine if a clutch-engagement rotational speed, calculated based on an engine rotational speed of the internal combustion engine, a gradient of the engine rotational speed of the internal combustion engine, a rotational speed of a gearbox input shaft and/or a gradient of the rotational speed of the gearbox input shaft, is lower than a predefined clutch-engagement rotational speed threshold; and
if the stall of the internal combustion engine is predicted, outputting a signal for initiating an increase of an engine torque demand of the internal combustion engine.

* * * * *